Patented Aug. 10, 1937

2,089,713

UNITED STATES PATENT OFFICE 2,089,713

PROCESS FOR MAKING BITUMINOUS COMPOSITIONS

Reyerus Nicolaas Jan Saal, Amsterdam, Netherlands, assignor to Shell Development Company, San Francisco, Calif., a corporation of Delaware No Drawing. Application March 22, 1937, Serial No. 132,346. In the Netherlands April 29, 1936

7 Claims. (Cl. 106—31)

This invention relates to a method for producing bituminous compositions such as asphalt pavements, surfaces and linings, from stone and bituminous substances, and in particular is concerned with a method for treating the mineral aggregates in a manner so that the composition made with the latter acquires an improved resistance against the effect of water.

It is the object of this invention to provide an improved process whereby bituminous compositions containing silicious mineral aggregate are produced which are more resistant to water than similar compositions heretofore produced.

It is well known that when a bituminous composition comprising a mineral aggregate covered with bituminous material remains in contact with water over an extended period of time, the water has a tendency to displace the bitumen from the surface of the stone, gravel, etc., causing the bitumen to retract from the surface, with the effect that the composition begins to disintegrate, particularly when exposed to road traffic. This difficulty is especially liable to occur in those cases in which mineral aggregates, containing free silicic acid or silicic acid radicals such as granite, basalt, quartzite, etc., are coated with cutback bitumen or road oils which are liquid at normal atmospheric temperatures.

It has already been proposed to treat mineral aggregates yielding bituminous compositions which are particularly susceptible to such deterioration with various salts, such as alkali metal soaps, water-insoluble lead salts, etc., or to dissolve oil-soluble heavy metal soaps in road oils to strengthen the bonds between the aggregate and bituminous materials.

I have discovered that even greater improvements in the strengthening of the bonds between bitumen and stone can be achieved when using small quantities of certain water-soluble iron salts. For some reason not definitely established these iron salts have a peculiar ability of greatly improving the adhesion of bituminous materials to mineral aggregates, in particular to aggregates containing free silicic acid or silicic acid radicals, with the result that the displacing effect of water is greatly reduced and in some instances is completely overcome.

One theory in explanation of the above, is that the effect of the iron salt is to produce water-insoluble iron silicates which apparently possess a more pronounced oleophil character than free silicic acid or silicates of metals other than iron, and therefore are preferentially wetted by the bituminous oil. Whatever the true reason for the remarkable property of iron salts may be, the fact is that they are considerably more effective than any of the salts heretofore used in preventing retraction of bitumen from the aggregate under all conditions which ordinarily are favorable to such retraction. In particular the iron salts are effective in counteracting the damage done by water as pointed out before.

The measurement of the degree of retraction is quite difficult and it has not been possible as yet to express it numerically. The only manner in which I have been able to compare the effect of iron salts with the effects of other salts, such as lead salts, calcium salts, alkali soaps, etc., is by visual comparison of mineral aggregates covered with a certain amount of a standardized bitumen under standard conditions, which were exposed to water for a certain length of time.

Iron salts to be effective must be soluble in water, substantially insoluble and preferably completely insoluble in mineral oil. They must not be emulsifying agents for water and oils. Iron salts of the type of iron soaps which are more or less soluble in mineral oils appear to be considerably less effective, perhaps because they react less completely with the silicates than the water-soluble iron salts and perhaps because a portion at least is or remains dissolved in the bituminous oil and is not available for improving the surface of the mineral aggregate.

Among the most suitable iron salts may be mentioned particularly the salts of the strong mineral acids as sulfuric, hydrochloric and nitric acids, ferrous sulfate and ferric chloride being preferred. Good results are also obtained with the water-soluble ferric or ferrous salts of lower organic acids having preferably not more than about 6 or 8 carbon atoms as ferric acetate, etc.

The amount of iron salt required is as a rule less than 1% and usually below .1% of the weight of the silicious mineral aggregate. If the salt is added to the aggregate in the form of an aqueous solution it is helpful to determine the retention capacity of the aggregate for water. From it the correct concentration of the solution can be calculated which will leave within the aggregate the desired amount of the salt.

Various methods may be employed for applying the iron salts to the mineral aggregates. The most simple method consists of preparing a dilute aqueous solution of the salt and sprinkling or drenching the aggregate therewith. If desired, the aggregate may be soaked in the solution. The wetted aggregate is preferably allowed to react for a while, the excess solution, if any, is then withdrawn and the aggregate so treated may be dried. The bituminous material such as road oil, cutback asphalt, etc. is now applied by any of the conventional methods normally employed for enveloping a mineral aggregate with bitumen as by sprinkling, mixing in a pug mill, rolling, etc.

If desired, the iron salt may be mixed with the aggregate in a dry state, for instance as a powder, after which the mixture is wetted with water to dissolve the salt, and thereafter bituminous oil is applied as above.

Still another method comprises mixing a small amount, usually less than .05% by weight of iron oxide with the aggregate and then introducing a dilute aqueous acid capable of dissolving the iron oxide. For such purpose sulfuric acid, hydrochloric acid, waste sulfuric acid from oil refining or from the activation of bleaching clays, the latter normally containing considerable amounts of iron salts, sludge acid from the sulfuric acid treatment of light hydrocarbons as gasoline, etc., may be used.

The drying of the mineral aggregate after treatment with aqueous salt solution, while not absolutely necessary, is very desirable, in that water which covers the surface prevents formation of a solid bond between the aggregate and bitumen, and if the bituminous composition of aggregate and asphalt is exposed to water before the bond has been formed, there is serious danger of extended retraction of the bitumen from the stone.

As hereinbefore mentioned the treatment is especially useful when applied to silicious mineral aggregates, particularly those containing free silicic acid. By that I mean to include natural and artificial stone, rock, gravel, sand, silicic acid containing filler as ground slag, clay, cement, etc.

The terms bitumen and bituminous materials as herein used refer to natural and artificial asphalts and solutions thereof in light and heavy distillate and residual oils, coal tar, coal tar pitch and its solutions, shale oils, residual mineral oils, resins and their solutions, or mixtures of these substances. Furthermore, rubber, rubber dispersions, hydrocarbon polymers or the like may be added to the bitumen.

Since the absence of water is necessary for the establishment of a solid bond between the aggregate and the bitumen, I prefer that the bituminous material be substantially anhydrous, i. e. not emulsified. This may be of particular importance when roads or the like are to be made during periods of frequent rainfall, or in the construction of asphalt linings in dam construction, where the danger of water seepage is liable to prevent evaporation of the water of emulsion.

Example I

Mount Sorrel granite was crushed and separate samples thereof were drenched with the following aqueous solutions:

(1) Ferric acetate containing .1 gram equivalent iron per liter.

(2) Lead acetate containing .1 gram equivalent lead per liter.

(3) Sodium acetate containing .1 gram equivalent sodium per liter.

After removing excess of the solutions and drying the three stone masses so obtained, each was thoroughly mixed with 5% by weight of a normally liquid mixture of 100 parts Mexican straight run asphalt of 100 penetration at 25° C. and 18 parts kerosene. The resulting bituminous compositions were then immersed in water for several days. It was found upon visual comparison that the asphalt had retracted by far the least from the iron treated stone.

Example II

A macadam road construction asphalt of excellent wearing properties and unusually high resistance toward the influence of water was produced by soaking basalt chippings in a .5% solution of ferrous sulfate, removing excess liquid and drying the stone. 80 parts of the basalt chippings so prepared were mixed with 12 parts of sand and 8 parts of ground slag. 100 parts of the graduated mixture so produced were enveloped with 5 parts of a bituminous oil. The latter was prepared by fluxing 100 parts of Mexican asphalt of 100 penetration at 25° C. with 18 parts of kerosene. All parts were by weight.

I claim as my invention:

1. In a process for producing an asphalt composition comprising a silicious mineral aggregate and bitumen having a high resistance to the deteriorating action of water, the steps of treating the silicious mineral aggregate with an aqueous solution of an iron salt which is insoluble in mineral oil, and enveloping the aggregate so produced with a bitumen.

2. In a process for producing an asphalt composition comprising a silicious mineral aggregate and bitumen having a high resistance to the deteriorating action of water, the steps of treating the silicious mineral aggregate with an aqueous solution of an iron salt which is insoluble in mineral oil, substantially drying the aggregate so treated, and enveloping the dried aggregate with a bitumen.

3. In a process for producing an asphalt composition comprising a silicious mineral aggregate and bitumen having a high resistance to the deteriorating action of water, the steps of treating the silicious mineral aggregate with an aqueous solution of an iron salt which is insoluble in mineral oil, substantially drying the aggregate so treated, and enveloping the dried aggregate with an anhydrous bitumen.

4. The process of claim 1 in which the iron salt is the salt of a strong mineral acid.

5. The process of claim 1 in which the iron salt is ferrous sulfate.

6. The process of claim 1 in which the iron salt is ferric chloride.

7. In a process for producing an asphalt composition comprising a silicious mineral aggregate and bitumen having a high resistance to the deteriorating action of water, the steps of mixing the silicious aggregate with a small amount of an iron oxide, treating the mixture with an aqueous solution of an acid capable of dissolving the iron oxide under conditions to dissolve the latter to form an iron salt which is substantially insoluble in mineral oils, and enveloping the aggregate so treated with a bitumen.

REYERUS NICOLAAS JAN SAAL.